US006567531B1

United States Patent
Kondo et al.

(10) Patent No.: US 6,567,531 B1
(45) Date of Patent: May 20, 2003

(54) IMAGE PROCESSING APPARATUS, IMAGE PROCESSING METHOD, AND PROVIDING MEDIUM

(75) Inventors: Tetsujiro Kondo, Toyko (JP); Kenji Tanaka, Chiba (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/366,872

(22) Filed: Aug. 4, 1999

(30) Foreign Application Priority Data

Aug. 6, 1998 (JP) .............................. 10-222951

(51) Int. Cl.$^7$ ................................. G06K 9/00
(52) U.S. Cl. ...................................... 382/100
(58) Field of Search ............................. 382/100, 232; 713/176, 179; 380/201, 203, 204, 216, 258

(56) References Cited

U.S. PATENT DOCUMENTS 5,721,788 A * 2/1998 Powell et al. ............... 382/100
5,819,289 A * 10/1998 Sandford, II et al. ...... 707/104.1
5,875,249 A * 2/1999 Mintzer et al. ............... 380/54
6,005,936 A * 12/1999 Shimizu et al. ............. 713/176
6,055,321 A * 4/2000 Numao et al. .............. 382/100
6,148,333 A * 11/2000 Guedalia et al. ............ 709/219

OTHER PUBLICATIONS

Nikolaidis N et al.: "Robust Image Watermarking in the Spatial Domain" Signal Processing European Journal Devoted to the Methods and Applications of Signal Processing, vol. 66, No. 3, May 28, 1998, pp. 385–403, XP004124959.

* cited by examiner

Primary Examiner—Andrew W. Johns
Assistant Examiner—Shervin Nakhjavan
(74) Attorney, Agent, or Firm—Frommer Lawrence & Haug LLP; William S. Frommer; Dennis M. Smid

(57) ABSTRACT

An image processing apparatus performs processing for embedding information in an image. The image processing apparatus includes a selection unit for selecting a pixel of the image. A processing unit performs processing on the pixel selected by the selection unit according to the information so that the pixel is reproducible by utilizing the correlation of the image. According to the above-described processing, the information is embedded in the pixel.

28 Claims, 12 Drawing Sheets

FIG. 3
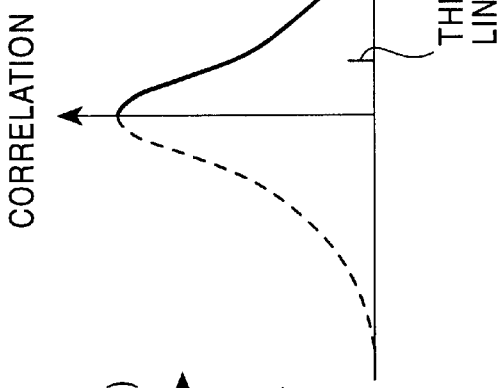
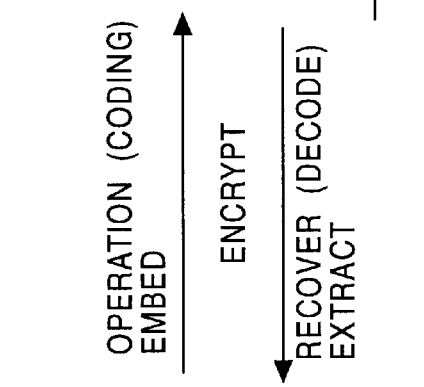
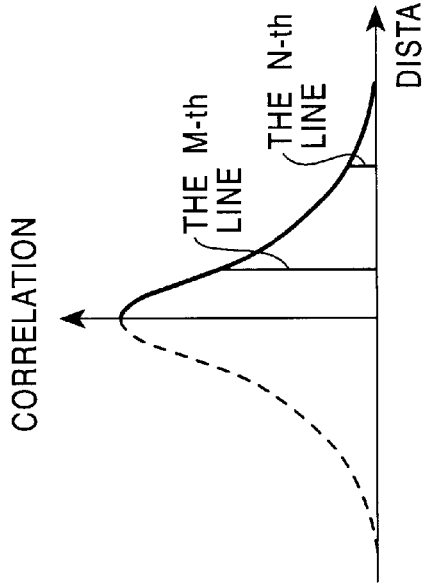

FIG. 8

| p(1,1) | p(2,1) | p(3,1) | p(4,1) | p(5,1) | p(6,1) | p(7,1) | p(8,1) | p(9,1) |
|---|---|---|---|---|---|---|---|---|
| p(1,2) | p(2,2) | p(3,2) | p(4,2) | p(5,2) | p(6,2) | p(7,2) | p(8,2) | p(9,2) |
| p(1,3) | p(2,3) | p(3,3) | p(4,3) | p(5,3) | p(6,3) | p(7,3) | p(8,3) | p(9,3) |
| p(1,4) | p(2,4) | p(3,4) | p(4,4) | p(5,4) | p(6,4) | p(7,4) | p(8,4) | p(9,4) |
| p(1,5) | p(2,5) | p(3,5) | p(4,5) | p(5,5) | p(6,5) | p(7,5) | p(8,5) | p(9,5) |
| p(1,6) | p(2,6) | p(3,6) | p(4,6) | p(5,6) | p(6,6) | p(7,6) | p(8,6) | p(9,6) |
| p(1,7) | p(2,7) | p(3,7) | p(4,7) | p(5,7) | p(6,7) | p(7,7) | p(8,7) | p(9,7) |
| p(1,8) | p(2,8) | p(3,8) | p(4,8) | p(5,8) | p(6,8) | p(7,8) | p(8,8) | p(9,8) |
| p(1,9) | p(2,9) | p(3,9) | p(4,9) | p(5,9) | p(6,9) | p(7,9) | p(8,9) | p(9,9) |
| p(1,10) | p(2,10) | p(3,10) | p(4,10) | p(5,10) | p(6,10) | p(7,10) | p(8,10) | p(9,10) |

FIG. 12

PIXEL

| p(1,1) | p(2,1) | p(3,1) | p(4,1) | p(5,1) | p(6,1) | p(7,1) | p(8,1) | p(9,1) |
| --- | --- | --- | --- | --- | --- | --- | --- | --- |
| p(1,2) | p(2,2) | p(3,2) | p(4,2) | p(5,2) | p(6,2) | p(7,2) | p(8,2) | p(9,2) |
| p(1,3) | p(2,3) | p(3,3) | p(4,3) | p(5,3) | p(6,3) | p(7,3) | p(8,3) | p(9,3) |
| (p(1,4)) | p(2,4) | p(3,4) | p(4,4) | (p(5,4)) | p(6,4) | p(7,4) | p(8,4) | p(9,4) |
| p(1,5) | p(2,5) | p(3,5) | p(4,5) | p(5,5) | p(6,5) | p(7,5) | p(8,5) | p(9,5) |
| p(1,6) | p(2,6) | p(3,6) | p(4,6) | p(5,6) | p(6,6) | p(7,6) | p(8,6) | p(9,6) |
| p(1,7) | p(2,7) | p(3,7) | p(4,7) | p(5,7) | p(6,7) | p(7,7) | p(8,7) | p(9,7) |
| (p(1,8)) | p(2,8) | p(3,8) | p(4,8) | (p(5,8)) | p(6,8) | p(7,8) | p(8,8) | p(9,8) |
| p(1,9) | p(2,9) | p(3,9) | p(4,9) | p(5,9) | p(6,9) | p(7,9) | p(8,9) | p(9,9) |
| p(1,10) | p(2,10) | p(3,10) | p(4,10) | p(5,10) | p(6,10) | p(7,10) | p(8,10) | p(9,10) |

IMAGE PROCESSING APPARATUS, IMAGE PROCESSING METHOD, AND PROVIDING MEDIUM

BACKGROUND OF THE INVENTION

1. Field of the Invention

The present invention generally relates to image processing apparatuses, image processing methods, and recording media. More particularly, the invention relates to an image processing apparatus and an image processing method in which information can be embedded in an image with a minimal level of degradation of the quality of reproduced images and without increasing the amount of data.

2. Description of the Related Art

One of the techniques of embedding information without increasing the amount of data is to convert the least significant bit (LSB) or the lower two bits of, for example, digital audio data into information to be embedded. In this technique, the lower bits of digital audio data, which do not significantly influence the sound quality, are simply substituted for the information to be embedded. Accordingly, when the digital audio data is reproduced, it is output as it is without restoring the lower bits into the original state. More specifically, since it is difficult to restore the lower bits embedded with information into the original state, and also, since the lower bits do not significantly influence the sound quality, the digital audio data is output while containing information embedded therein.

According to the above-described technique, however, a signal different from the original signal is disadvantageously output, which, to some degree, affects the sound quality if the signal is audio data, or influences the image quality if the signal is video data.

SUMMARY OF THE INVENTION

Accordingly, in view of the above background, it is an object of the present invention to embed information in an image with a minimal level of degradation of the image quality and without increasing the amount of data.

In order to achieve the above object, according to one aspect of the present invention, there is provided an image processing apparatus for performing processing for embedding information in an image. The apparatus includes selection means for selecting a pixel of the image. Processing means performs processing on the pixel selected by the selection means according to the information so that the pixel is reproducible by utilizing a correlation of the image, thereby embedding the information in the pixel.

According to another aspect of the present invention, there is provided an image processing method for performing processing for embedding information in an image. The method includes a selection step of selecting a pixel of the image, and a processing step of performing processing on the pixel selected in the selection step according to the information so that the pixel is reproducible by utilizing a correlation of the image, thereby embedding the information in the pixel.

According to still another aspect of the present invention, there is provided a providing medium for providing a computer program for enabling a computer to perform processing for embedding information in an image. The computer program includes a selection step of selecting a pixel of the image, and a processing step of performing processing on the pixel selected in the selection step according to the information so that the pixel is reproducible by utilizing a correlation of the image, thereby embedding the information in the pixel.

According to a further aspect of the present invention, there is provided a providing medium for providing an information-embedded image in which information is embedded. The information-embedded image is obtained by embedding the information in the image by selecting a pixel of the image, and by performing processing on the selected pixel according to the information so that the pixel is reproducible by utilizing a correlation of the image.

According to a further aspect of the present invention, there is provided an image processing apparatus for performing processing for decoding an information-embedded image into an original image and original information. The apparatus includes selection means for selecting a pixel of the image-embedded information. Processing means performs predetermined processing on the pixel selected by the selection means. Correlation calculation means calculates a first correlation between the pixel selected by the selection means and a peripheral pixel around the selected pixel, and calculates a second correlation between the pixel selected by the selection means and processed by the processing means and the peripheral pixel around the pixel. Comparison means compares the first correlation and the second correlation. Decoding means decodes the pixel selected by the selection means and the information embedded in the pixel based on a result obtained by the comparison means.

According to a yet further aspect of the present invention, there is provided an image processing method for performing processing for decoding information-embedded image into an original image and original information. The method includes a selection step of selecting a pixel of the information-embedded image, a processing step of performing predetermined processing on the pixel selected in the selection step, a correlation calculation step of calculating a first correlation between the pixel selected in the selection step and a peripheral pixel around the selected pixel and calculating a second correlation between the pixel selected in the selection step and processed in the processing step and the peripheral pixel around the pixel, a comparison step of comparing the first correlation and the second correlation, and a decoding step of decoding the pixel selected in the selection step and the information embedded in the pixel based on a result obtained in the comparison step.

According to a further aspect of the present invention, there is provided a providing medium for providing a computer program for enabling a computer to perform processing for decoding information-embedded image into an original image and original information. The computer program includes a selection step of selecting a pixel of the information-embedded image, a processing step of performing predetermined processing on the pixel selected in the selection step, a correlation calculation step of calculating a first correlation between the pixel selected in the selection step and a peripheral pixel around the selected pixel and calculating a second correlation between the pixel selected in the selection step and processed in the processing step and the peripheral pixel around the pixel, a comparison step of comparing the first correlation and the second correlation, and a decoding step of decoding the pixel selected in the selection step and the information embedded in the pixel based on a result obtained in the comparison step.

According to a further aspect of the present invention, there is provided an image processing apparatus including a transmitter for transmitting an information-embedded image obtained by embedding information and a receiver for receiving the information-embedded image from the transmitter and for decoding the image. The transmitter includes first selection means for selecting a pixel of the image. First processing means performs processing on the pixel selected by the first selection means according to the information so that the pixel is reproducible by utilizing a correlation of the image, thereby embedding the information in the pixel and outputting the information-embedded image. The receiver includes second selection means for selecting a pixel of the information-embedded image. Second processing means performs predetermined processing on the pixel selected by the second selection means. Correlation calculation means calculates a first correlation between the pixel selected by the second selection means and a peripheral pixel around the selected pixel and calculates a second correlation between the pixel selected by the second selection means and processed by the second processing means and the peripheral pixel around the pixel. Comparison means compares the first correlation and the second correlation. Decoding means decodes the pixel selected by the second selection means and the information embedded in the pixel based on a result obtained by the comparison means.

According to a further aspect of the present invention, there is provided an image processing method for use in an image processing apparatus including a transmitter for transmitting an information-embedded image obtained by embedding information and a receiver for receiving the information-embedded image from the transmitter and for decoding the image. The method includes the steps of selecting a pixel of the image by the transmitter, performing processing by the transmitter on the selected pixel according to the information so that the pixel is reproducible by utilizing a correlation of the image, thereby embedding the information in the pixel and outputting the information-embedded image, selecting the pixel of the information-embedded image by the receiver, performing predetermined processing by the receiver on the selected pixel, calculating by the receiver a first correlation between the pixel selected from the information-embedded image and a peripheral pixel around the selected pixel and calculating a second correlation between the pixel selected from the information-embedded image and undergone the predetermined processing and the peripheral pixel around the pixel, comparing the first correlation and the second correlation by the receiver, and decoding the pixel selected from the information-embedded image and the information embedded in the pixel by the receiver based on a result of comparison.

BRIEF DESCRIPTION OF THE DRAWINGS

FIGS. 3A and 3B illustrate the coding/decoding operation performed by utilizing the correlation;

FIG. 8 illustrates the processing in step S1 of FIG. 7;

FIG. 12 illustrates the processing for embedding one-bit information in four pixels.

DESCRIPTION OF THE PREFERRED EMBODIMENTS

Figure 1:
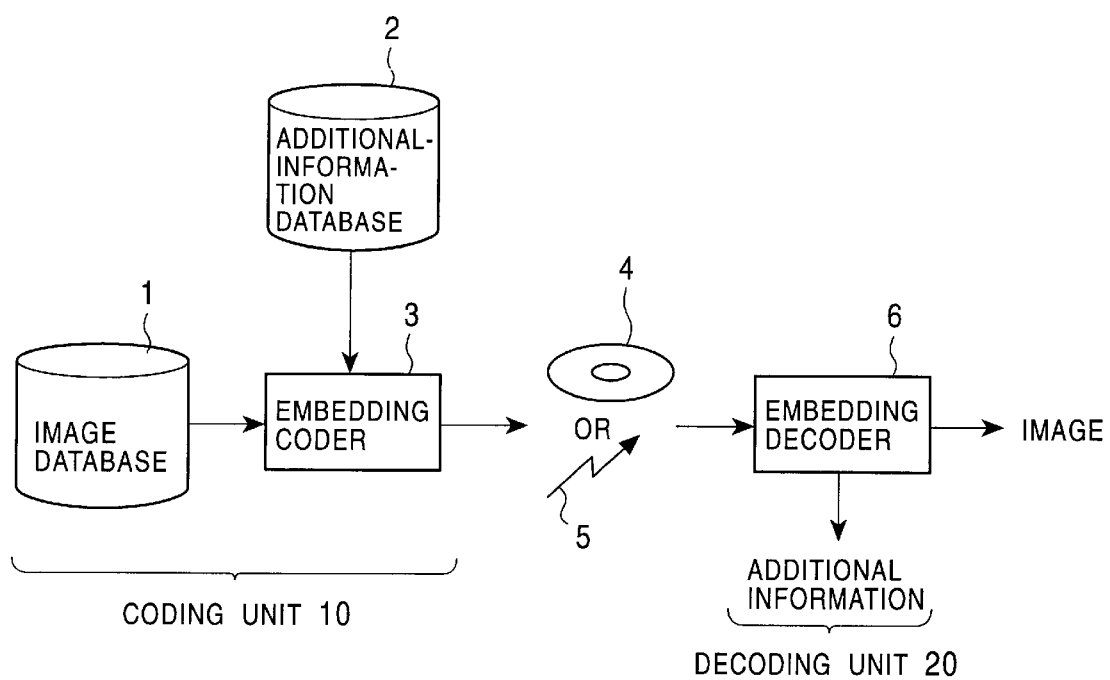
FIG. 1 is a block diagram illustrating an example of the configuration of an image transmission system incorporating the present invention.

An embodiment of the present invention is described below. For clarifying the relationship between the individual means set forth in the claims and the corresponding components of the following embodiment, the characteristics of the present invention are described by adding the corresponding components of the embodiment (only an example) in parentheses to the respective means.

An image processing apparatus set forth in claim 1 performs processing for embedding information in an image. The image processing apparatus includes selection means for selecting a pixel of the image (for example, a program processing step S1 of FIG. 7). Processing means (for example, a program processing step S3 of FIG. 7) performs processing on the pixel selected by the selection means according to the information so that the pixel is reproducible by utilizing a correlation of the image, thereby embedding the information in the pixel.

An image processing apparatus set forth in claim 20 performs processing for decoding an information-embedded image into an original image and original information. The apparatus includes selection means for selecting a pixel of the image-embedded information (for example, a program processing step S11 of FIG. 11). Processing means (for example, a program processing step S12 of FIG. 11) performs predetermined processing on the pixel selected by the selection means. Correlation calculation means (for example, a program processing step S15 of FIG. 11) calculates a first correlation between the pixel selected by the selection means and a peripheral pixel around the selected pixel, and calculates a second correlation between the pixel selected by the selection means and processed by the processing means and the peripheral pixel around the pixel. Comparison means (for example, a program processing step S16 of FIG. 11) compares the first correlation and the second correlation. Decoding means (for example, program processing steps S17 through S19 of FIG. 11) decodes the pixel selected by the selection means and the information embedded in the pixel based on a result obtained by the comparison means.

An image processing apparatus set forth in claim 33 includes a transmitter for transmitting an information-embedded image obtained by embedding information and a receiver for receiving the information-embedded image from the transmitter and for decoding the image. The transmitter includes first selection means for selecting a pixel of the image (for example, a program processing step S1 of FIG. 7). First processing means (for example, a program processing step S3 of FIG. 7) performs processing on the pixel selected by the first selection means according to the information so that the pixel is reproducible by utilizing a correlation of the image, thereby embedding the information in the pixel and outputting the information-embedded image. The receiver includes second selection means for selecting a pixel of the information-embedded image (for example, a program processing step S11 of FIG.

11). Second processing means (for example, a program processing step S12 of FIG. 11) performs predetermined processing on the pixel selected by the second selection means. Correlation calculation means (for example, a program processing step S15 of FIG. 11) calculates a first correlation between the pixel selected by the second selection means and a peripheral pixel around the selected pixel, and calculates a second correlation between the pixel selected by the second selection means and processed by second processing means and the peripheral pixel around the pixel. Comparison means (for example, a program processing step S16 of FIG. 11) compares the first correlation and the second correlation. Decoding means (for example, program processing steps S17 through S19 of FIG. 11) decodes the pixel selected by the second selection means and the information embedded in the pixel based on a result obtained by the comparison means.

The foregoing description is not intended to restrict the means set forth in the claims to the above-described components.

FIG. 1 is a schematic diagram illustrating an image transmission system incorporating the present invention. In this specification, a "system" may be a unit logically formed of a plurality of apparatuses, and it is not necessary that the apparatuses be contained in the same housing.

Referring to FIG. 1, the image transmission system is formed of a coding unit 10 and a decoding unit 20. The coding unit 10 codes, for example, an image (first information), and outputs the coded data. The decoding unit 20 reproduces the coded data into the original image.

More specifically, an image database 1 stores images to be coded (for example, digital images), and an image is read from the image database 1 and is supplied to an embedding coder 3. An additional-information database 2 stores additional information (digital data) as information to be embedded in the image to be coded. The additional information is read from the additional-information database 2 and is supplied to the embedding coder 3.

Upon receiving the image from the image database 1 and the additional information from the additional-information database 2, the embedding coder 3 codes the image in accordance with the additional information supplied from the additional-information database 2 so that the coded image can be decoded by utilizing the energy distribution of the image supplied from the image database 1. That is, the embedding coder 3 codes the image by embedding the additional information in the image so that the coded image can be decoded by utilizing the energy distribution of the image, and outputs the coded data. The coded data may then be recorded in a recording medium 4, such as a magneto-optical disk, a magnetic disk, an optical disc, a magnetic tape, or a PD disk. Alternatively, the coded data may be transmitted to the decoding unit 20 via a transmission medium 5, such as a terrestrial broadcast signal, a satellite broadcast signal, a cable television (CATV) network, the Internet, or a public network.

The decoding unit 20 is formed of an embedding decoder 6 in which the coded data provided via the recording medium 4 or the transmission medium 5 is received. The embedding decoder 6 further decodes the coded data into the original image and into the additional information by utilizing the energy distribution of the image. The decoded image is then supplied to a monitor (not shown) and is displayed. The decoded additional information is used for performing predetermined processing.

The principle of the coding operation performed by the embedding coder 3 and the decoding operation performed by the embedding decoder 6 is described below.

Generally, what is called "information" possesses an energy (entropy) distribution, which is identified as information (useful information). More specifically, for example, an image obtained by photographing a landscape can be identified as an image of the landscape. This is because the image (the values of the pixels forming the image) possesses an energy distribution corresponding to the landscape. An image without an energy distribution is merely noise, and is useless as information.

Consequently, even if the energy distribution possessed by a piece of useful information is destroyed by performing a certain operation, the original information can be reproduced by restoring the destroyed energy distribution to the original state. That is, the coded data obtained by coding the information can be decoded into the original information by utilizing the energy distribution inherent in the information.

The energy distribution of information can be represented by, for example, correlation, continuity, and similarity.

The correlation of information is the correlation between the elements of the information (for example, if the information is an image, the pixels or the lines forming the image), i.e., the self-correlation or the distance between the elements forming the information.

Figure 2:
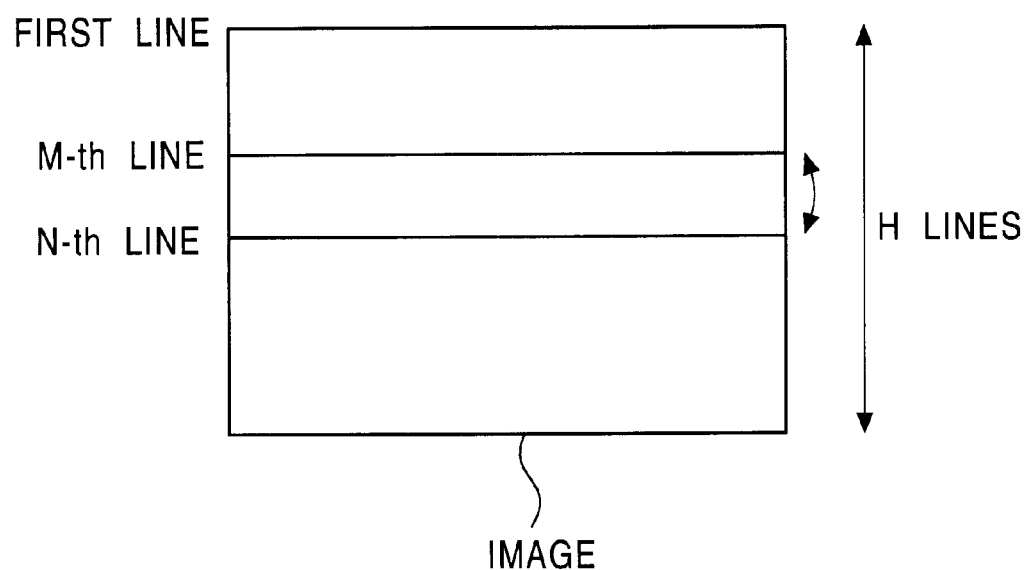
FIG. 2 illustrates an image to be coded.

An image formed of H lines, such as that shown in FIG. 2, is taken as an example. Concerning the correlation between the first line and another line, as illustrated in FIG. 3A, the correlation of the first line to a line located closer to the first line (an upper line of the image shown in FIG. 2) is greater. Conversely, the correlation of the first line to a line positioned farther from the first line (a lower line of the image shown in FIG. 2) is smaller. In other words, the image shown in FIG. 2 has a correlation distribution in which a line closer to the first line has a greater level of correlation, and a line farther from the first line has a smaller level of correlation.

In the image shown in FIG. 2, the M-th line closer to the first line and the N-th line farther from the first line are swapped ($1<M<N\leq H$), and after calculating the correlation between the first line and each of the M-th line and the N-th line, the resultant image may be indicated, as shown in FIG. 3B. That is, in the image in which the M-th line and the N-th line have been swapped, the correlation of the first line to the M-th line closer to the first line (corresponding to the N-th line before being swapped) becomes smaller, while the correlation of the first line to the N-th line farther from the first line (corresponding to the M-th line before being swapped) becomes greater.

Thus, the original correlation distribution is destroyed in the correlation shown in FIG. 3B. Generally, however, concerning images, the destroyed correlation distribution can be restored to the original state by utilizing the original correlation distribution. That is, the correlation distribution shown in FIG. 3B is unnatural (incorrect) in terms of the original correlation distribution possessed by the image, and the M-th line and the N-th line should be swapped. Thus, the unnatural distribution can be restored to the correct distribution shown in FIG. 3A, so that the original image can be decoded.

According to the example shown in FIGS. 2, 3A, and 3B, the image is coded by exchanging the lines. In this case, the embedding coder 3 determines which lines should be moved and swapped according to the additional information. Meanwhile, the embedding decoder 6 returns the swapped lines to the original positions by utilizing the correlation, i.e., replaces the coded image by the original image, thereby decoding the coded image. During the decoding operation, the embedding decoder 6 detects which lines have been moved and swapped so as to decode the additional information embedded in the image.

Figure 4:
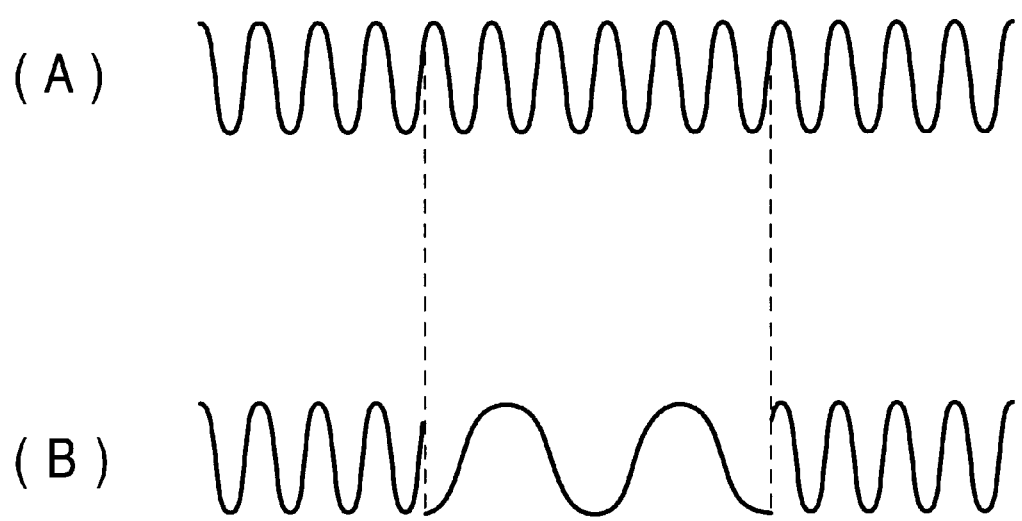
FIGS. 4A and 4B illustrate the coding/decoding operation performed by utilizing the continuity.

Concerning the continuity, as another element of the energy distribution, for example, one line of an image can be represented by, as shown in FIG. 4A, a signal waveform indicating the continuity of a frequency change (a smooth frequency change). In other words, the frequency of one line of an image is continuously changed.

Then, the signal waveform whose frequency is continuously changed, as shown in FIG. 4A, is partially substituted with an extremely low frequency, as illustrated in FIG. 4B.

In this case, the continuity of a frequency change is destroyed. Generally, however, the destroyed continuity of the signal waveform can be restored to the original state by utilizing the characteristics in which the frequency change is continuous. That is, in FIG. 4B, it is unnatural that part of the frequency of the signal waveform is much lower than that of the remaining portion of the waveform, and thus, it should be corrected to a portion similar to the remaining portion. Then, the signal waveform illustrated in FIG. 4B can be decoded into the signal waveform shown in FIG. 4A, i.e., the original signal waveform.

In the example shown in FIGS. 4A and 4B, the image is coded by significantly changing part of the signal waveform (replacing it by a lower frequency). When coding the image, the embedding coder 3 determines from the additional information which part of the frequency is to be significantly changed and to what degree the frequency is to be changed. The embedding decoder 6 reproduces the original signal waveform from the coded signal, part of which is greatly different from the remaining portions, by utilizing the continuity characteristics of the signal, thereby decoding the coded signal into the original signal. When decoding the signal, the embedding decoder 6 detects which part of the frequency has been significantly changed and to which degree the frequency has been changed, thereby decoding the embedded additional information.

Figure 5A:
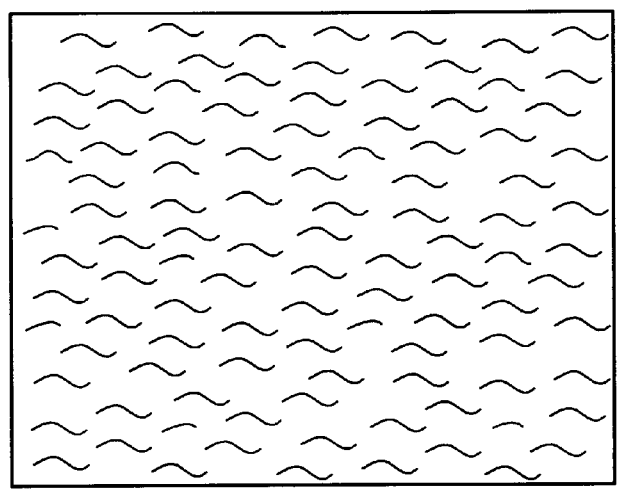
FIGS. 5A and 5B illustrate the coding/decoding operation performed by utilizing the similarity.

The similarity, which is another element representing the energy distribution, is as follows. For example, it is now assumed that an image has been obtained by photographing a landscape. An enlarged image of the original landscape image can be generated by employing a fractal (self-similarity). More specifically, for example, an image obtained by photographing a sea, as shown in FIG. 5A, is enlarged by employing a fractal, resulting in an image (enlarged image) having characteristics similar to those of the original image. Accordingly, the original image has similarity.

Figure 5B:
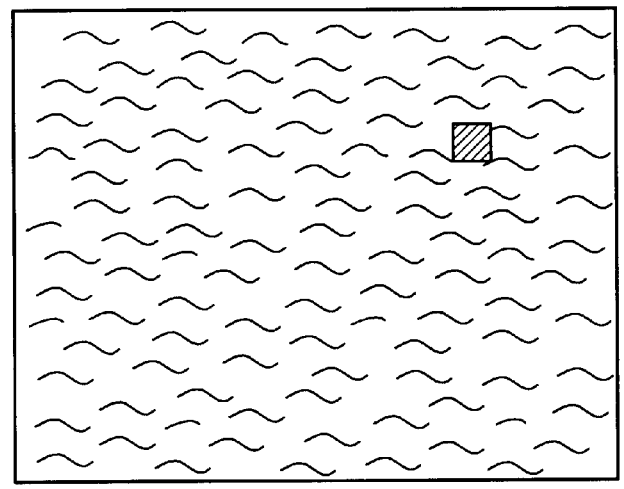

Then, the image of the sea illustrated in FIG. 5A is partially substituted by part of an image obtained by photographing a forest (indicated by the hatched portion of FIG. 5B).

In this case, the similarity is destroyed in the portion of the image of the sea which has been substituted by part of the image of the forest. Generally, however, the destroyed similarity can be restored by utilizing the following similarity characteristics. That is, whichever portion of the image of the sea is enlarged, the enlarged portion has characteristics similar to those of the original image. More specifically, it is unnatural in terms of the similarity possessed by the image of the sea that part of the image is replaced by part of the image of the forest. The portion of the forest should be replaced by an image having characteristics similar to those of the surrounding portion of the sea. Then, the complete image of the sea shown in FIG. 5A, i.e., the original image, can be decoded from the image illustrated in FIG. 5B.

In the example shown in FIGS. 5A and 5B, the image can be coded by replacing part of the image of the sea by the image of the forest. When coding the image, the embedding coder 3 determines from the additional information which portion of the image of the sea is to be substituted by an image of the forest. Meanwhile, the embedding decoder 6 reproduces the complete image of the sea from the coded signal, i.e., from the image having a portion of the forest, by utilizing the similarity characteristics, thereby decoding the coded image into the original image. During the decoding operation, the embedding decoder 6 detects which portion of the image of the sea has been replaced by the image of the forest, thereby decoding the embedded additional information.

As discussed above, the embedding coder 3 codes the image according to the additional information so that the coded image can be decoded by utilizing the energy distribution possessed by the image. Upon receiving the coded data, the embedding decoder 6 decodes the coded data into the original image and into the additional information by employing the energy distribution possessed by the image without requiring the overhead for decoding.

The state of the coded image having embedded information therein is different from that of the original image, thereby achieving encryption of the image without requiring the overhead.

Additionally, completely reversible digital watermarking can be implemented. More specifically, according to conventional digital watermarking, the lower bits of pixel values, which do not significantly influence the image quality, are simply changed into values corresponding to digital watermarking. Since it is difficult to restore the lower bits into the original state, the original image cannot be completely reproduced. As a result, the quality of the decoded image is, to some degree, degraded by using the lower bits for digital watermarking. In contrast, when the coded data is decoded by utilizing the energy distribution possessed by the original image, the original image and the added information can be reproduced. Thus, the additional information can be safely used as digital watermarking without the loss of the quality of the decoded image, which cannot be implemented by conventional digital watermarking.

The embedded information can be extracted by decoding the image from the coded data, thereby enabling the provision of side information while obtaining the coded image without requiring the overhead. In other words, since the additional information can be embedded without needing the overhead for extracting the added information, the resultant coded data with the embedded information has been compressed by an amount equal to the added information (embed-compression). Accordingly, for example, if one half of the image is coded, and the remaining half is used as additional information, half of the whole image can be embedded in the other half, thus compressing the whole image into one half.

Since the coded data is decoded by utilizing the energy distribution possessed by the original image, i.e., by using statistics, the decoded data is resistant to errors. That is, robust coding (statistical coding) having highly robust characteristics can be implemented.

Also, since the coded data is decoded by employing the energy distribution inherent in the original image, a greater amount of additional information can be embedded in the image whose energy distribution has more distinctive characteristics, for example, an image having a higher level of activity and a lower level of redundancy. As discussed above, if the additional information is embedded in the original image, the coded data has been compressed by an amount equal to the additional information. In terms of compression, when the image is coded according to the additional information (by using the embed-coding technique) so that the coded image can be decoded by utilizing the energy distribution possessed by the image, the compression ratio becomes higher as the image has a higher level of activity and a lower level of redundancy. In this point, the embed-coding technique significantly differs from conventional coding techniques in which the compression ratio becomes lower as the image has a higher level of activity and a lower level of redundancy.

Additionally, by using an image as an object to be coded and by using a medium which is different from the image, for example, sound, as additional information, the image can be provided by using the sound as a key. More specifically, in the coding unit 10, the sound "Open sesame!" issued by a contractor is embedded in the image as additional information. In the decoding unit 20, the user is obliged to issue the sound "Open sesame!", which is compared with the sound embedded in the image, thereby performing speaker identification. Upon the execution of the speaker identification, the image is automatically provided only when it is determined that the user is a contractor. In this case, as the sound used as additional information, a sound waveform itself can be used instead of what is called a feature parameter.

Conversely, by employing sound as an object to be coded and by using a medium which is different from sound, for example, an image, as additional information, the sound can be provided by using the image as a key, i.e., face-recognition sound response can be implemented. More specifically, in the coding unit 10, for example, an image of a user's face is embedded in sound as a response to the user. In the decoding unit 20, a user's face is photographed to obtain an image, and the face image embedded in the sound matching the above image is searched, thereby outputting the corresponding sound. It is thus possible to implement a sound response system for responding to the users by issuing the different types of sound according to the users.

It is also possible to embed information using a certain medium in information using the same type of medium, for example, sound in sound or an image in an image. Alternatively, a contractor's voice and face image may be embedded in an original image. Then, only when a user's voice and face image coincide with those embedded in the image, the original image is provided, thereby achieving the implementation of what is called a dual key system.

Alternatively, for example, concerning an image and sound synchronized with each other, which form a television broadcast signal, one of the two media is embedded in the other, in which case, different media information can be integrated, i.e., integrated coding can be implemented.

In the embed-coding technique, as stated above, a greater amount of additional information can be embedded in information whose energy distribution exhibits more distinctive characteristics. Accordingly, for example, between two items of information, the information whose energy distribution has more distinctive characteristics is adaptively selected, and the other information is embedded in the selected information, thereby making it possible to control the entire amount of data. That is, between two items of information, the amount of one item of information can be absorbed in the other item of information. As a result, since the entire amount of data can be controlled, it is possible to transmit information having the quantity of data which is compatible with the data band and the traffic of the transmission channel, and other transmission environments. That is, environment-compatible network transmission can be implemented.

Additionally, a reduced image is embedded in the original image (or decimated sound is embedded in the original sound), thereby achieving the implementation of hierarchical coding without increasing the amount of data.

In an original image, an image used as a key for retrieving the original image is embedded. As a consequence, it is possible to provide a database for retrieving original images based on images used as a key.

Figure 6:
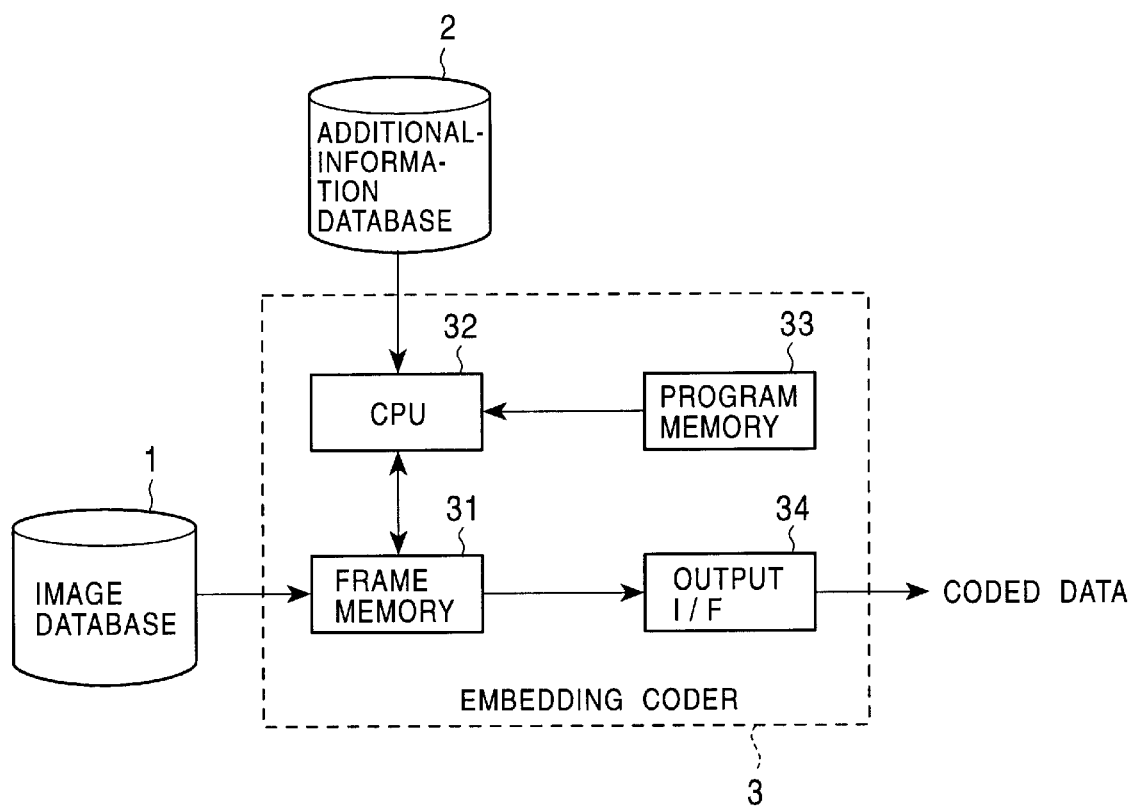
FIG. 6 is a block diagram illustrating an example of the configuration of an embedding coder 3 shown in FIG. 1.

FIG. 6 illustrates an example of the configuration of the embedding coder 3 shown in FIG. 1 that performs embed-coding by embedding additional information in an image so that the coded image can be decoded into the original image by utilizing the correlation of the image.

Images output from the image database 1 are supplied to a frame memory 31 in which the images are temporarily stored in units of frames. A central processing unit (CPU) 32 performs embed-coding processing, which will be described below, by executing a program stored in a program memory 33. That is, the CPU 32 receives each bit of additional information from the additional-information database 2 and embeds the one-bit additional information in the image stored in the frame memory 31. More specifically, the CPU 32 selects part of the pixels forming the image stored in the frame memory 31 and performs predetermined processing on the selected pixels according to the additional information so that the original image can be reproduced by utilizing the correlation of the image. As a result, the additional information can be embedded in the selected pixels.

The program memory 33 is formed of, for example, a read only memory (ROM) or a random access memory (RAM), and stores a computer program for enabling the CPU 32 to execute the embed-coding processing. An output interface (I/F) 34 reads an image having embedded additional information therein from the frame memory 31 and outputs it as coded data.

The frame memory 31 is formed of a plurality of banks so that a plurality of frames can be stored. By switching the banks, the frame memory 31 simultaneously stores the image supplied from the image database 1 and the pixels of the image to be processed by the CPU 32. Concurrently, the frame memory 31 also outputs the image having the embedded information therein (coded data). With this arrangement, the coded data can be output in real time even if the image supplied from the image database 1 is a moving picture.

Figure 7:
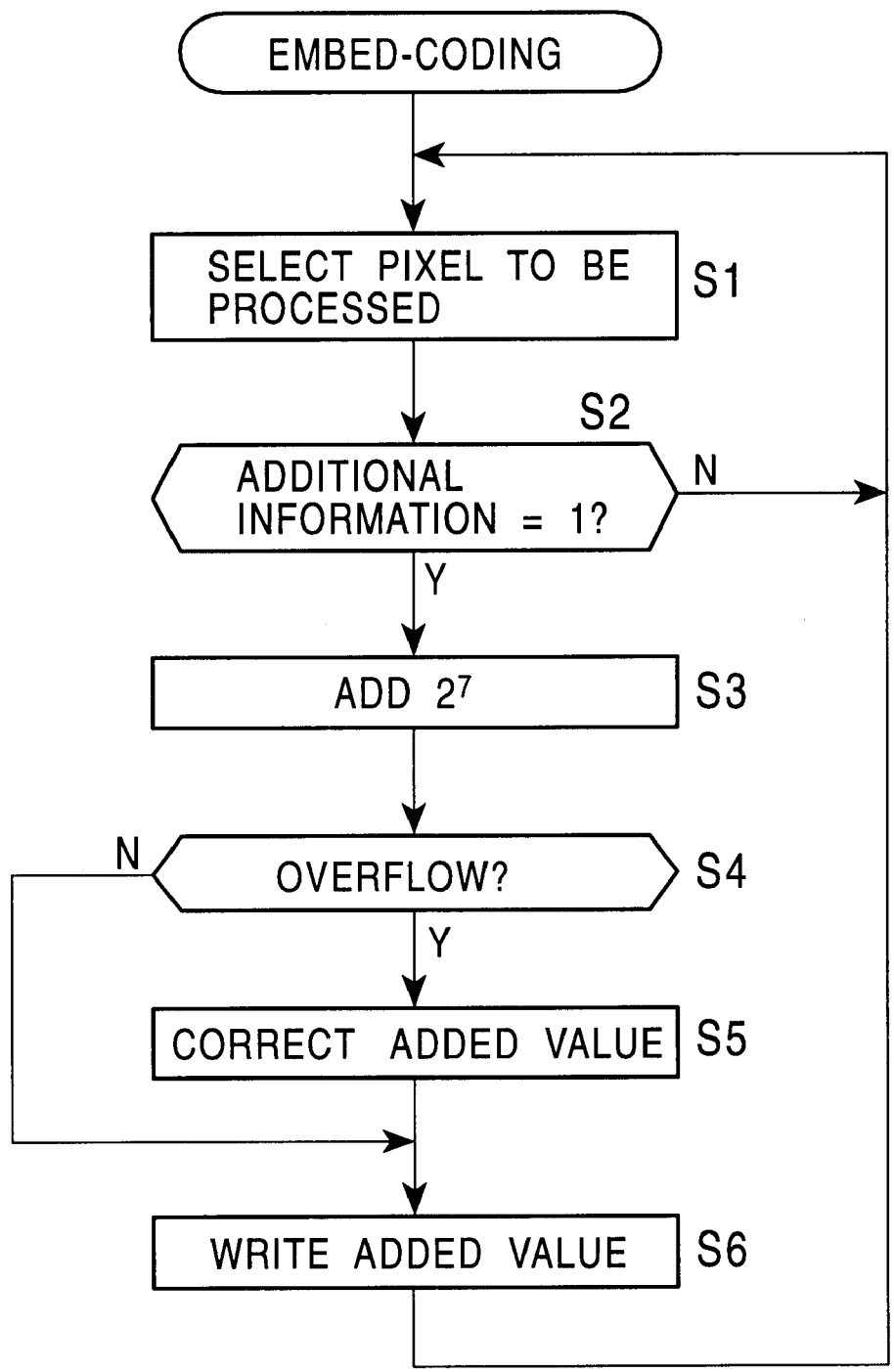
FIG. 7 is a flow chart illustrating the embed-coding processing.

The embed-coding processing performed by the embedding coder 3 is described below with reference to the flow chart of FIG. 7.

Images are read from the image database 1 and are supplied to the frame memory 31 and stored therein in units of frames. Meanwhile, the CPU 32 receives each bit of additional information from the additional-information database 2. In step S1, upon receiving one-bit additional information, the CPU 32 selects from the frame memory 31 the pixels in which the added information is to be embedded (pixels to be processed).

In this embodiment, pixels are alternately selected from the image stored in the frame memory 31 according to a checkerboard pattern, as shown in FIG. 8. That is, every time the processing of step S1 is executed, the CPU 32 sequentially selects a pixel without a hatched portion in FIG. 8, one-by-one, as a pixel to be processed according to, for example, line scanning. In FIG. 8, p(x, y) indicates the pixel positioned at the x-th column from the left and the y-th row from the top (the same applies to the pixels shown in FIG. 12).

Subsequently, in step S2, the CPU 32 determines whether the additional information received from the additional-information database 2 is 1 or 0. If it is found in step S2 that the additional information is 0, the process returns to step S1. That is, if the additional information is 0, the CPU 32 does not perform any processing on the selected pixel (adds 0 as a predetermined constant), and returns to step S1. In step S1, the CPU 32 waits for subsequent one-bit additional information supplied from the additional-information database 2 and selects a pixel to be processed. Thereafter, processing similar to that discussed above is repeated.

If it is determined in step S2 that the additional information is 1, the process proceeds to step S3. In step S3, the CPU 32 performs predetermined processing on the selected pixel, more specifically, the CPU 32 adds a predetermined constant to the value of the selected pixel, such as two to the power of the value obtained by subtracting one from the number of bits assigned to the pixel. For example, if eight bits are assigned to the pixel of the image, $2^7$ is added to the value of the pixel to be processed in step S3.

If the pixel value is represented by a luminance component Y, and color components U and V, the above-described addition may be made on any one of the components Y, U, and V. If the pixel value is indicated by components R, G, and B, the above-described addition may be performed on any one of the components R, G, and B.

In step S4, it is determined whether the value obtained in step S3 causes an overflow. If the outcome of step S4 is no, the process proceeds to step S6 in which the CPU 32 writes (overwrites) the added value into the frame memory 31 as the value of the pixel to be processed. The process then returns to step S1.

If it is found in step S4 that the added value causes an overflow, i.e., that the value is $2^8$ or greater, the process proceeds to step S5 in which the added value is corrected. That is, in step S5, the overflowed value is corrected, for example, by an amount equal to the value overflowed (to the value obtained by subtracting $2^8$ from the overflowed added value). The process then proceeds to step S6 in which the CPU 32 writes the corrected value into the frame memory 31 as the value of the pixel to be processed, and waits for a subsequent one-bit additional information supplied from the additional-information database 2.

After the image for one frame stored in the frame memory 31 has been processed, the output I/F 34 reads the one-frame image (having the additional information embedded therein) as coded data, and the CPU 32 continues to execute processing on a subsequent one-frame image stored in the frame memory 31.

As described above, part of the pixels forming the image stored in the frame memory 31 is selected, and the processing corresponding to the additional information is performed on the selected pixels so that the original image can be decoded by utilizing the correlation of the image, thereby embedding the additional information in the selected pixels. With this arrangement, the additional information can be embedded in the image with minimal loss of the image quality without increasing the amount of data.

That is, the pixels having the embedded additional information therein can be decoded (restored) into the original pixels and into the additional information without requiring the overhead by utilizing the correlation of the image, i.e., the correlation between the pixels with the additional information and the pixels without the additional information. Accordingly, the resulting decoded image (reproduced image) is basically free from the degradation of the image quality caused by embedding the additional information.

Figure 9:
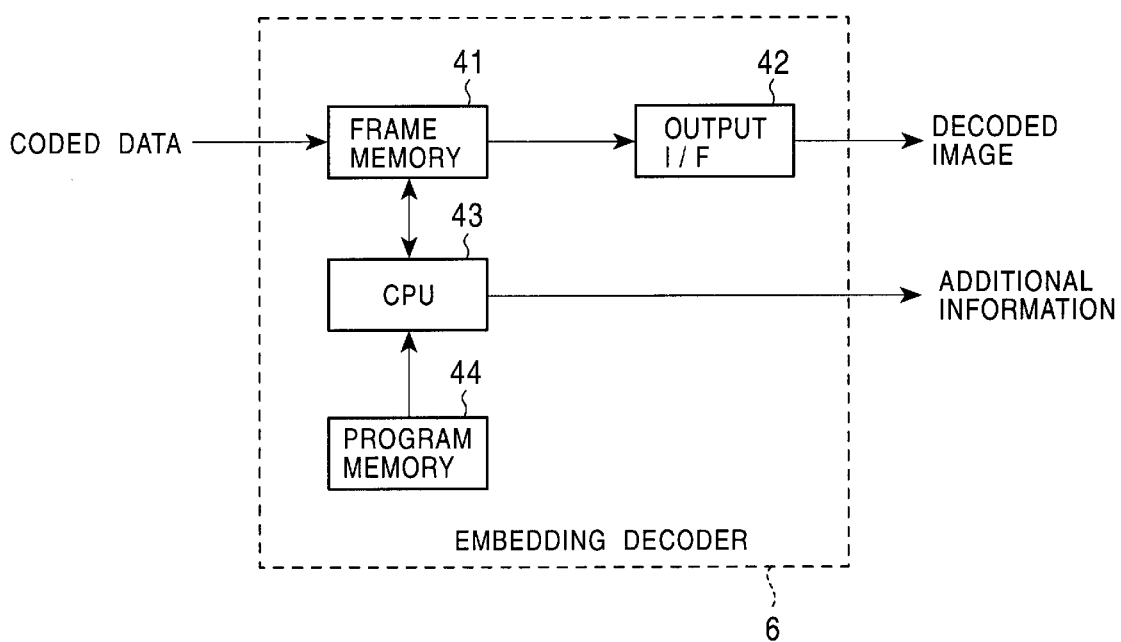
FIG. 9 is a block diagram illustrating an example of the configuration of an embed-decoder 6 shown in FIG. 1.

FIG. 9 illustrates an example of the configuration of the embedding decoder 6 shown in FIG. 1 that decodes the coded data output from the embedding coder 3 shown in FIG. 6 into the original image and into the additional information by utilizing the correlation of the image.

The coded data, i.e., the image having the embedded additional information (hereinafter sometimes referred to as an "embed image"), is supplied to a frame memory 41. The frame memory 41 temporarily stores therein the embedded images in units of frames. The frame memory 41 is constructed similarly to the frame memory 31 shown in FIG. 6, and by changing the banks, the embed images can be processed in real time even if the images are moving pictures. An output interface (I/F) 42 reads an image (decoded image) obtained by performing embed-decoding processing by a CPU 43, which will be discussed later, and outputs the decoded image.

Figure 10:
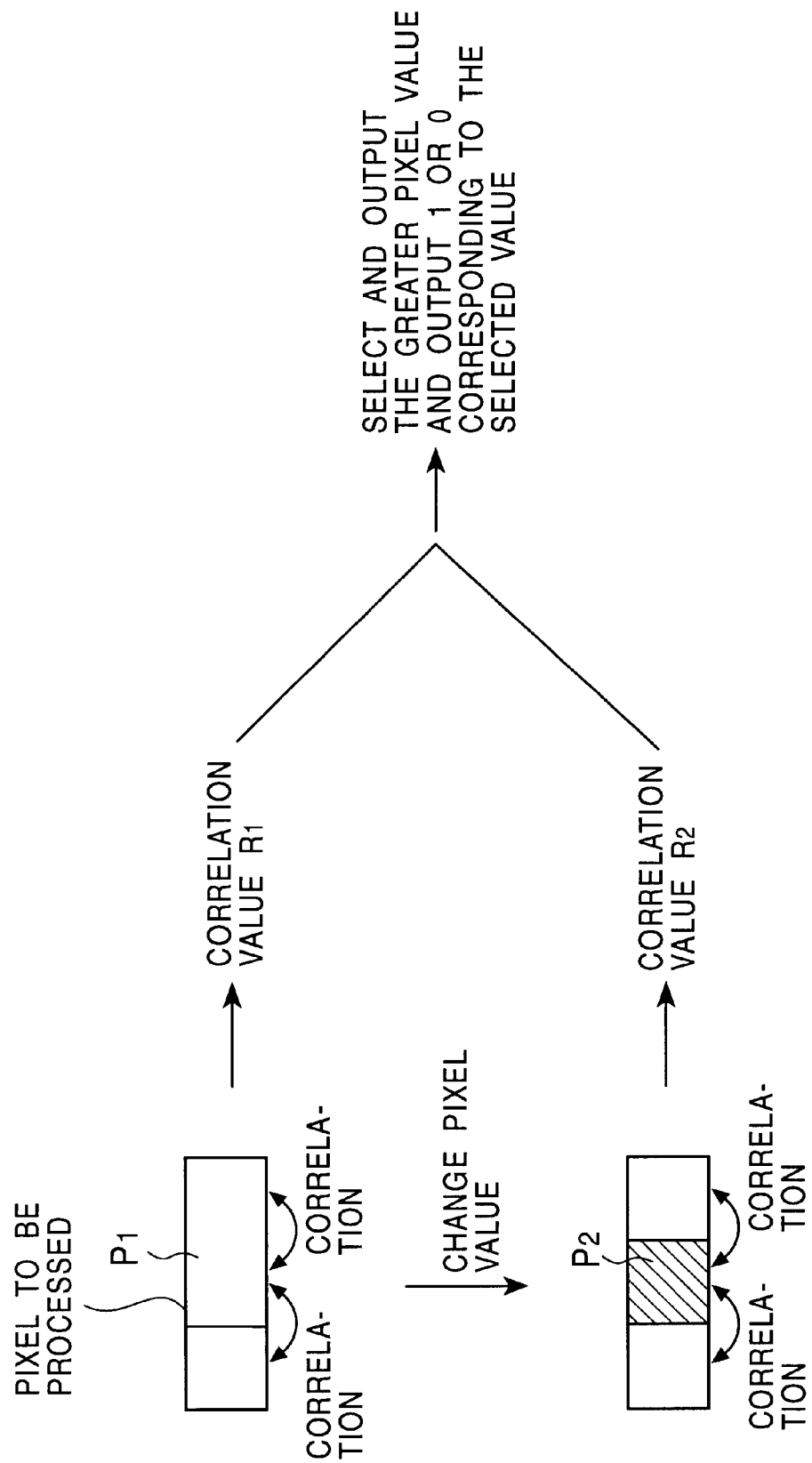
FIG. 10 illustrates the processing performed by a CPU 43 shown in FIG. 9.

The CPU 43 performs embed-decoding processing by executing a program stored in a program memory 44. That is, the CPU 43 decodes the embed image stored in the frame memory 41 into the original image and into the additional information by utilizing the correlation of the image. More specifically, the CPU 43 selects part of the pixels forming the embed image as pixels to be processed, and performs processing opposite to the processing executed by the CPU 32 shown in FIG. 6, as illustrated in FIG. 10, on the selected pixel, thereby changing the pixel value. The CPU 32 then calculates a correlation value $R_1$ (first correlation) between the pixel to be processed before the pixel value is changed and the peripheral pixels (which are horizontally adjacent to the pixel to be processed in the embodiment shown in FIG. 10), and also calculates a correlation value $R_2$ (second correlation) between the pixel to be processed after the pixel value has been changed and the peripheral pixels. Then, the CPU 32 compares the correlation value $R_1$ with the correlation value $R_2$. Based on the comparison result, the CPU 43 selects one of the pixel values before being changed and after being changed and determines the selected value as the decoded value, and also decodes the additional information embedded in the decoded image (1 or 0).

The program memory 43 is constructed similarly to the program memory 33 shown in FIG. 6 and stores therein a computer program for enabling the CPU 43 to perform embed-decoding processing.

Figure 11:
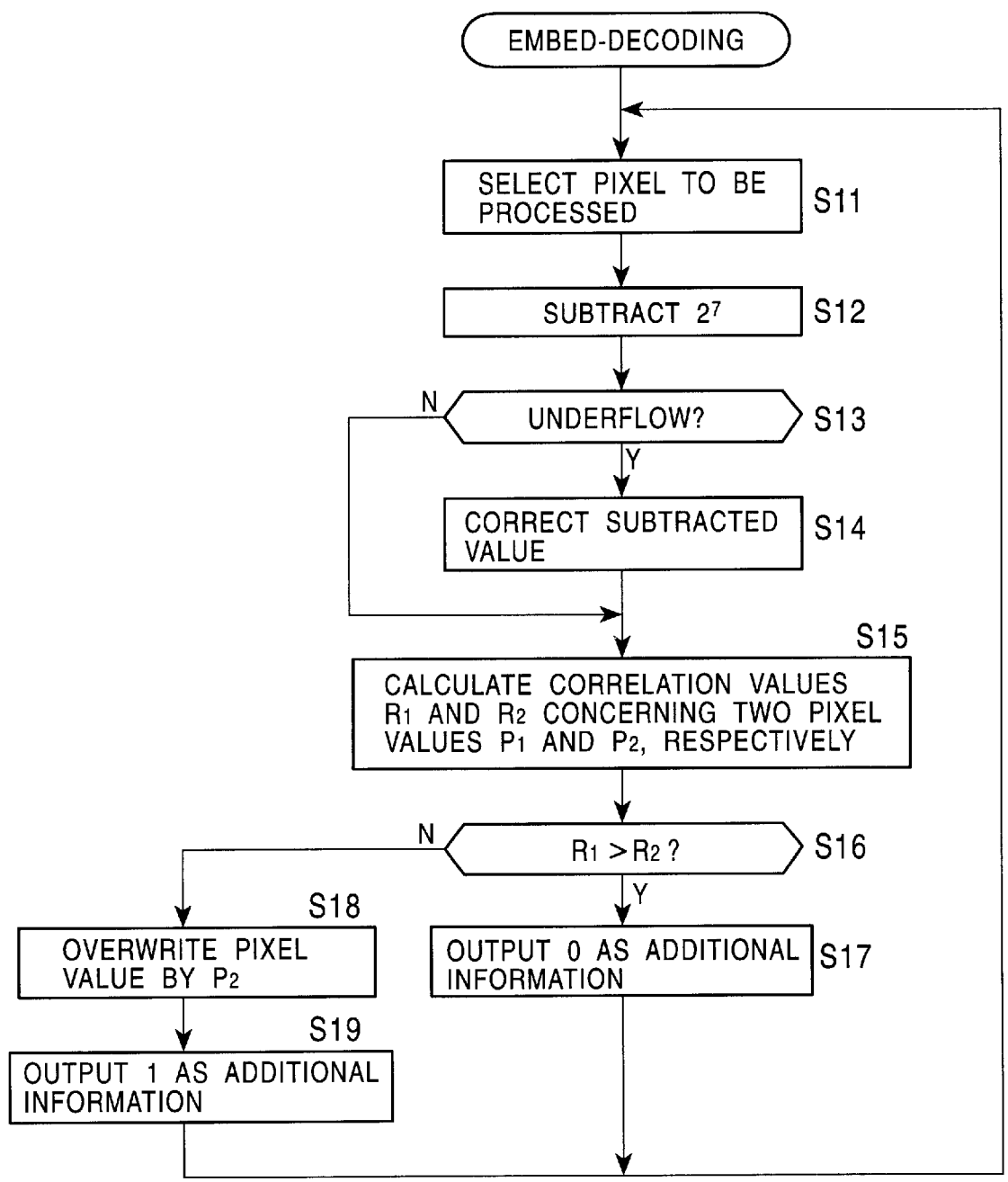
FIG. 11 is a flow chart illustrating the embed-decoding processing.

The embed-decoding processing performed by the embedding decoder 6 is discussed below with reference to the flow chart of FIG. 11.

Embed images are sequentially stored in units of frames in the frame memory 41. In step S11, the CPU 43 selects the pixel to be decoded (pixel to be processed) from an embed image stored in the frame memory 41.

As in the case of the CPU 32 shown in FIG. 6, the CPU 43 alternately selects pixels from the embed image stored in the frame memory 41 according to a checkerboard pattern, as illustrated in FIG. 8. That is, every time the processing of step S11 is executed, the CPU 43 sequentially selects a pixel without a hatched portion in FIG. 8, one-by-one, as a pixel to be processed, according to, for example, line scanning.

In step S12, the CPU 43 executes processing, on the pixel opposite to the processing performed by the CPU 32 shown in FIG. 6. That is, the CPU 43 subtracts a predetermined constant from the pixel value, i.e., two to the power of the value obtained by subtracting one from the number of bits assigned to the pixel of the image. For example, if eight bits are assigned to the pixel value, as stated above, $2^7$ is subtracted from the value of the pixel to be processed in step S12.

If the pixel value is represented by a luminance component Y, and color components U and V, the above-described subtraction may be made on any one of the components Y, U, and V. If the pixel value is indicated by components R, G, and B, the above-described subtraction may be performed on any one of the components R, G, and B. It is necessary, however, that the subtraction in step S12 should be made on the same type of component as that on which the addition in step S3 of FIG. 7 has been performed. More specifically, if the pixel value is represented by, for example, Y, U, and V, and the addition in step S3 of FIG. 7 has been performed on, for example, the Y component, the subtraction should also be made on the Y component in step S12.

After subtracting $2^7$ from the pixel value in step S12, the process proceeds to step S13 in which it is determined whether the subtracted value causes an underflow. If the outcome of step S13 is no, the process skips step S14 and proceeds to step S15.

On the other hand, if it is found in step S13 that the subtracted value causes an underflow, i.e., the subtracted value is less than zero, the process proceeds to step S14 in which the subtracted value is corrected. That is, in step S14, the underflowed subtracted value is corrected to, for example, the value obtained by adding $2^8$ to the subtracted value. The process then proceeds to step S15.

In step S15, the CPU 43 calculates a correlation value $R_1$ between the pixel value $P_1$ (the value from which $2^7$ is not subtracted in step S12, hereinafter sometimes referred to as the "first pixel value") and peripheral pixels, for example, pixels horizontally adjacent to the pixel $P_1$. The CPU 43 also calculates a correlation value $R_2$ between the subtracted pixel value $P_2$ (which has been corrected in step S14, hereinafter sometimes referred to as the "second pixel value") and peripheral pixels, for example, pixels horizontally adjacent to the pixel $P_2$.

More specifically, in step S15, an absolute value of the difference between the first pixel value $P_1$ and each of the adjacent pixel values is calculated, and the two absolute values are added. The resulting value is then determined to be the correlation value $R_1$ with respect to the first pixel value $P_1$. In step S15, an absolute value of the difference between the second pixel value $P_2$ and each of the adjacent pixel values is also calculated, and the two absolute values are added. The resulting value is then determined to be the correlation value $R_2$ with respect to the second pixel value $P_2$.

In step S15, the pixels used for obtaining the correlation values $R_1$ and $R_2$ are not restricted to the pixels horizontally adjacent to the pixel $P_1$ or $P_2$, and may be pixels vertically adjacent to the pixel $P_1$ or $P_2$ or may be pixels temporally adjacent to the pixel $P_1$ or $P_2$. It is not necessary that the pixels for obtaining the correlation values $R_1$ and $R_2$ be spatially or temporally adjacent. Yet, it is desirable that the pixels indicated by hatched portions in FIG. 8, i.e., the pixels without embedded additional information, be used for determining the correlation values $R_1$ and $R_2$ with respect to the pixels $P_1$ and $P_2$, respectively. The reason for this is as follows. Even if the correlation value between the pixel $P_1$ or $P_2$ and the pixels having embedded information therein is obtained, the correlation of the pixel $P_1$ or $P_2$ to the original image cannot be acquired, which makes it impossible to utilize the principle of the correlation of the image. It is thus difficult to correctly decode the original pixel values and the additional information from the pixels having the embedded additional information therein. Additionally, since the pixel $P_1$ or $P_2$ is decoded by utilizing the correlation of the image, it is preferable that the pixels used for obtaining the correlation values $R_1$ and $R_2$ be positioned spatially or temporally adjacent to the pixel $P_1$ or $P_2$.

Then, after calculating the correlation values $R_1$ and $R_2$, the process proceeds to step S16 in which the CPU 43 compares the correlation values $R_1$ and $R_2$.

If it is determined in step S16 that the correlation value $R_1$ is greater than the correlation value $R_2$, the process proceeds to step S17. In step S17, the CPU 43 outputs 0 as the decoded additional information, and returns to step S11. In this case, the value stored in the frame memory 41 is not overwritten, and thus, the decoded pixel value remains the same as the pixel value $P_1$.

More specifically, it has been determined in step S16 that the correlation value $R_1$ concerning the first pixel value $P_1$ is greater than the correlation value $R_2$ concerning the second pixel value $P_2$. It is thus demonstrated that the pixel to be decoded may be more precisely represented by the pixel value $P_1$ than the pixel value $P_2$, and the pixel value $P_1$ is then determined to be the decoded pixel value. Since $2^7$ is not subtracted from the pixel value $P_1$ in step S12, it can be considered that $2^7$ has not been added in step S3 of FIG. 7. In the embed-coding processing shown in FIG. 7, it is determined that $2^7$ is not added when the additional information indicates 0. Thus, if the correlation value $R_1$ concerning the first pixel value $P_1$ is greater than the correlation value $R_2$ concerning the second pixel value $P_2$, and if it is likely that the pixel value $P_1$ rather than the pixel value $P_2$ is determined to be the pixel value to be decoded, the additional information embedded in the corresponding pixel is 0.

If it is determined in step S16 that the correlation value $R_2$ is equal to or greater than the correlation value $R_1$, the process proceeds to step S18. In step S18, the CPU 43 overwrites the pixel value stored in the frame memory 41 by the value obtained by subtracting $2^7$ from the pixel value, i.e., by the second pixel value $P_2$. In this case, therefore, the pixel value $P_2$ is determined to be the decoded pixel value. The process then proceeds to step S19 in which the CPU 43 outputs 1 as the decoded additional information. The process then returns to step S11.

More specifically, it has been determined in step S16 that the correlation value $R_2$ concerning the second pixel value $P_2$ is equal to or greater than the correlation value $R_1$ concerning the first pixel value $P_1$. It is thus revealed that the pixel to be decoded can be represented more precisely by the pixel value $P_2$ than the pixel value $P_1$. Accordingly, the pixel value $P_2$ is determined to be the decoded pixel value. Since $2^7$ is subtracted from the pixel value $P_2$ in step S12, it can be considered that $2^7$ has been added in step S3 of FIG. 7. In the embed-coding processing shown in FIG. 7, it is determined that $2^7$ is added when the additional information indicates 1. Thus, if the correlation value $R_2$ concerning the second pixel value $P_2$ is equal to or greater than the correlation value $R_1$ concerning the first pixel value $P_1$, and if it is likely that the pixel value $P_2$ is determined to be the pixel value to be decoded, the additional information embedded in the corresponding pixel is 1.

If the difference between the correlation values $R_1$ and $R_2$ obtained as described above is small, it is not possible to unambiguously determine which correlation value $R_1$ or $R_2$ can be used more precisely as the pixel value to be decoded. Accordingly, in this case, not only horizontally adjacent pixels, but also other pixels, may be used for obtaining the correlation values $R_1$ and $R_2$ with respect to the pixel values $P_1$ and $P_2$, respectively. The correlation values $R_1$ and $R_2$ may be then compared, thereby determining which correlation value $R_1$ or $R_2$ can be more precisely used as the decoded pixel.

According to the foregoing description, the coded data representing an image having embedded additional information therein is decoded into the original image and into the additional information by utilizing the correlation of the image, thereby achieving the decoding operation without requiring the overhead for decoding. Accordingly, the decoded image (reproduced image) is basically free from the degradation of the image quality caused by embedding the information into the original image.

Although in this embodiment an absolute value of the difference between the pixel to be processed and another pixel is used as a correlation value between these pixels, the correlation value is not limited to the absolute value obtained as described above.

In this embodiment, pixels are alternately selected from the image according to a checkerboard pattern, as shown in FIG. 8, and additional information is embedded in the selected pixels. However, the pixels may be selected in a pattern different from the above. As stated above, however, in decoding the pixels having the embedded additional information therein, pixels without embedded additional information are desirably selected for obtaining the correlation. The correlation between the pixels becomes smaller as the pixels are spatially or temporally farther away from each other. Accordingly, with a view to achieving precise decoding, the pixels in which additional information are to be embedded should be spatially or temporally selected sparsely. On the other hand, for the purpose of embedding a greater amount of additional information, i.e., for the increased compression ratio, the number of pixels to be selected should be increased to some degree in order to embed the additional information therein. Thus, it is desirable that the pixels for embedding additional information be selected while considering a good balance between precise decoding and a considerably high compression ratio.

In this embodiment, one-bit additional information is embedded in one pixel selected as a pixel to be processed. However, additional information having two bits or greater may be embedded in one pixel. If, for example, two-bit additional information, is embedded in one pixel, one of 0, $2^6$, $2^7$, and $2^6+2^7$ may be added to the pixel value according to the two-bit additional information.

In the foregoing embodiment, the additional information is embedded by adding 0 or $2^7$ to the pixel value (in other words, by adding $2^7$ or not adding $2^7$). The value to be added to the pixel value is not limited to $2^7$. If, however, a value which may produce an influence on only the lower bits of the pixel value is added, the resulting added pixel value does not become substantially different from the original pixel value. Accordingly, no substantial difference be observed between the correlation values $R_1$ and $R_2$ obtained in step S15 of FIG. 11. This decreases the precision of the decoded pixel and the decoded additional information. It is therefore desirable that the value to be added to the pixel value according to the additional information be a value which may produce an influence on the upper bits of the original pixel value.

According to the foregoing embodiment, the additional information is embedded by adding a predetermined value to the pixel value. However, the additional information may be embedded by performing an operation on the pixel value other than the addition (for example, bit inversion). As discussed above, however, with a view to maintaining the quality of the decoded pixel value and the decoded additional information, the operation should be determined so that a significant difference can be produced between the correlation value concerning the original pixel value and the correlation value concerning the pixel value obtained after performing the corresponding operation.

In the foregoing embodiment, one-bit additional information is embedded in one pixel. However, one-bit additional information may be embedded in a plurality of pixels, e.g., in four bits indicated by the circled pixels shown in FIG. 12.

More specifically, it is now assumed that one-bit additional information is embedded in the four pixels p(1, 4), p(5, 4), p(1, 8), and p(5, 8), as illustrated in FIG. 12. In the coding operation, the same operation is conducted on each of the pixels p(1, 4), p(5, 4), p(1, 8), and p(5, 8) according to the additional information, thereby embedding the one-bit additional information in the four pixels. In the decoding operation, the aforementioned correlation value $R_1$ concerning the first pixel value $P_1$ and the correlation value $R_2$ concerning the second pixel value $P_2$ are calculated with respect to each of the pixels p(1, 4), p(5, 4), p(1, 8), and p(5, 8). Then, the correlation value $R_1$ and the correlation value $R_2$ are compared. Upon comparison, the greater pixel values are determined to be the decoded pixel values p(1, 4), p(5, 4), p(1, 8), and p(5, 8) and the decoded additional information. Alternatively, the sum of the correlation values $R_1$ concerning the first pixel values $P_1$ and the sum of the correlation values $R_2$ concerning the second pixel values $P_2$ with respect to all the pixel values p(1, 4), p(5, 4), p(1, 8), and p(5, 8) may be obtained, and upon comparing the two sums, the greater sum may be determined to be the decoded pixel values p(1, 4), p(5, 4), p(1, 8), p(5, 8) and the decoded additional information.

If pixels are alternately selected from the image according to a checkerboard pattern, as shown in FIG. 8, and one-bit additional information is embedded in each of the selected pixels, additional information having the number of bits about one-half the number of pixels of the image can be embedded. However, when one-bit additional information is embedded in four bits, as discussed above, the number of bits of the additional information to be embedded in the selected pixels is reduced to one-eighth the number of pixels of the image.

The type of information used as additional information is not particularly restricted, and may be an image, sound, text, a computer program, or other types of data. The image database 1 may contain images to be supplied to the frame memory 31 and additional information. With this arrangement, the additional information can be embedded in the image, thereby achieving the compression of the image.

According to the foregoing embodiment, the embed-coding processing and the embed-decoding processing are performed by executing the computer programs by the CPUs 32 and 43, respectively. However, the embed-coding processing or the embed-decoding processing may be executed by using hardware exclusively used for the corresponding processing.

In the foregoing embodiment, the computer programs executed by the CPUs 32 and 43 are stored in the program memory 33 and the program memory 44, respectively. The computer program may be provided via a recording medium, such as, a magnetic tape, a magnetic disk, an optical disc, a magneto-optical disk, or a PD disk, or a transmission medium, such as the Internet, a terrestrial broadcast signal, a satellite broadcast signal, a public network, or a CATV network.

What is claimed is:

1. An image processing apparatus for performing processing for embedding information in an image, said apparatus comprising:

selection means for selecting a pixel of the image; and processing means for performing processing on the pixel selected by said selection means so that a correlation between the pixel and adjacent pixels to the pixel becomes smaller selectively according to the information and the pixel is reproducible by utilizing the correlation of the image, thereby embedding the information in the pixel.

2. An image processing apparatus according to claim 1, wherein said processing means performs the processing on one of a luminance component and a color component of the pixel.

3. An image processing apparatus according to claim 1, wherein said processing means adds a predetermined value corresponding to the information to a value of the pixel.

4. An image processing apparatus according to claim 1, wherein said processing means embeds the information having one bit in the pixel.

5. An image processing apparatus according to claim 1, wherein said processing means embeds the information having one bit in a plurality of the pixels.

6. An image processing apparatus according to claim 1, wherein said selection means alternately selects the pixels from the image according to a checkerboard pattern.

7. An image processing method for performing processing for embedding information in an image, said method comprising:

a selection step of selecting a pixel of the image; and a processing step of performing processing on the pixel selected in said selection step so that a correlation between the pixel and adjacent pixels to the pixel becomes smaller selectively according to the information and the pixel is reproducible by utilizing the correlation of the image, thereby embedding the information in the pixel.

8. A computer-readable medium for storing a computer program for enabling a computer to perform processing for embedding information in an image, said computer program comprising:

a selection step of selecting a pixel of the image; and a processing step of performing processing on the pixel selected in said selection step so that a correlation between the pixel and adjacent pixels to the pixel becomes smaller selectively according to the information and the pixel is reproducible by utilizing the correlation of the image, thereby embedding the information in the pixel.

9. A computer-readable medium according to claim 8, wherein said processing step performs the processing on one of a luminance component and a color component of the pixel.

10. A computer-readable medium according to claim 8, wherein said processing step adds a predetermined value corresponding to the information to a value of the pixel.

11. A computer-readable medium according to claim 8, wherein said processing step embeds the information having one bit in the pixel.

12. A computer-readable medium according to claim 8, wherein said processing step embeds the information having one bit in a plurality of the pixel.

13. A computer-readable medium according to claim 8, wherein said selection step alternately selects the pixels from the image according to a checkerboard pattern.

14. An image processing apparatus for performing processing for decoding an information-embedded image into an original image and original information, said apparatus comprising:

selection means for selecting a pixel of the image-embedded information;

processing means for performing predetermined processing on the pixel selected by said selection means;

correlation calculation means for calculating a first correlation between the pixel selected by said selection means and a peripheral pixel around the selected pixel, and for calculating a second correlation between the pixel selected by said selection means and processed by said processing means and the peripheral pixel around the pixel;

comparison means for comparing the first correlation and the second correlation; and decoding means for decoding the pixel selected by said selection means and the information embedded in the pixel based on a result obtained by said comparison means.

15. An image processing apparatus according to claim 14, wherein said processing means performs the predetermined processing on one of a luminance component and a color component of the pixel.

16. An image processing apparatus according to claim 14, wherein said processing means subtracts a predetermined value from a value of the pixel.

17. An image processing apparatus according to claim 14, wherein said decoding means decodes the information having one bit from the pixel.

18. An image processing apparatus according to claim 14, wherein said decoding means decodes the information having one bit from a plurality of the pixels.

19. An image processing apparatus according to claim 14, wherein said selection means alternately selects the pixels from the information-embedded image according to a checkerboard pattern.

20. An image processing method for performing processing for decoding information-embedded image into an original image and original information, said method comprising:

a selection step of selecting a pixel of the information-embedded image;

a processing step of performing predetermined processing on the pixel selected in said selection step;

a correlation calculation step of calculating a first correlation between the pixel selected in said selection step and a peripheral pixel around the selected pixel, and calculating a second correlation between the pixel selected in said selection step and processed in said processing step and the peripheral pixel around the pixel;

a comparison step of comparing the first correlation and the second correlation; and a decoding step of decoding the pixel selected in said selection step and the information embedded in the pixel based on a result obtained in said comparison step.

21. A computer-readable medium for storing a computer program for enabling a computer to perform processing for decoding information-embedded image into an original image and original information, said computer program comprising:

a selection step of selecting a pixel of the information-embedded image;

a processing step of performing predetermined processing on the pixel selected in said selection step so that a correlation between the pixel and adjacent pixels to the pixel becomes smaller selectively;

a correlation calculation step of calculating a first correlation between the pixel selected in said selection step and a peripheral pixel around the selected pixel, and calculating a second correlation between the pixel selected in said selection step and processed in said processing step and the peripheral pixel around the pixel;

a comparison step of comparing the first correlation and the second correlation; and a decoding step of decoding the pixel selected in said selection step and the information embedded in the pixel based on a result obtained in said comparison step.

22. A computer-readable medium according to claim 21, wherein said processing step performs the predetermined processing on one of a luminance component and a color component of the pixel.

23. A computer-readable medium according to claim 21, wherein said processing step subtracts a predetermined value from a value of the pixel.

24. A computer-readable medium according to claim 21, wherein said decoding step decodes the information having one bit from the pixel.

25. A computer-readable medium according to claim 21, wherein said decoding step decodes the information having one bit from a plurality of the pixels.

26. A computer-readable medium according to claim 21, wherein said selection step alternately selects the pixels from the information-embedded image according to a checkerboard pattern.

27. An image processing apparatus including a transmitter for transmitting an information-embedded image obtained by embedding information and a receiver for receiving the information-embedded image from said transmitter and for decoding the image, said transmitter comprising:
first selection means for selecting a pixel of the image;
first processing means for performing processing on the pixel selected by said first selection means according to the information so that the pixel is reproducible by utilizing a correlation of the image, thereby embedding the information in the pixel and outputting the information-embedded image, said receiver comprising:
second selection means for selecting a pixel of the information-embedded image;
second processing means for performing predetermined processing on the pixel selected by said second selection means;
correlation calculation means for calculating a first correlation between the pixel selected by said second selection means and a peripheral pixel around the selected pixel, and for calculating a second correlation between the pixel selected by said second selection means and processed by said second processing means and the peripheral pixel around the pixel;
comparison means for comparing the first correlation and the second correlation; and
decoding means for decoding the pixel selected by said second selection means and the information embedded in the pixel based on a result obtained by said comparison means.

28. An image processing method for use in an image processing apparatus including a transmitter for transmitting an information-embedded image obtained by embedding information and a receiver for receiving the information-embedded image from said transmitter and for decoding the image, said method comprising the steps of:

selecting a pixel of the image by said transmitter;

performing processing by said transmitter on the selected pixel according to the information so that the pixel is reproducible by utilizing a correlation of the image, thereby embedding the information in the pixel and outputting the information-embedded image;

selecting the pixel of the information-embedded image by said receiver;

performing predetermined processing by said receiver on the selected pixel;

calculating by said receiver a first correlation between the pixel selected from the information-embedded image and a peripheral pixel around the selected pixel, and calculating a second correlation between the pixel selected from the information-embedded image and undergone the predetermined processing and the peripheral pixel around the pixel;

comparing the first correlation and the second correlation by said receiver; and decoding the pixel selected from the information-embedded image and the information embedded in the pixel by said receiver based on a result of comparison.

* * * * *